RICHARDSON & ADAMS.
Potato Digger.
No. 61,259.  Patented Jan. 15, 1867.
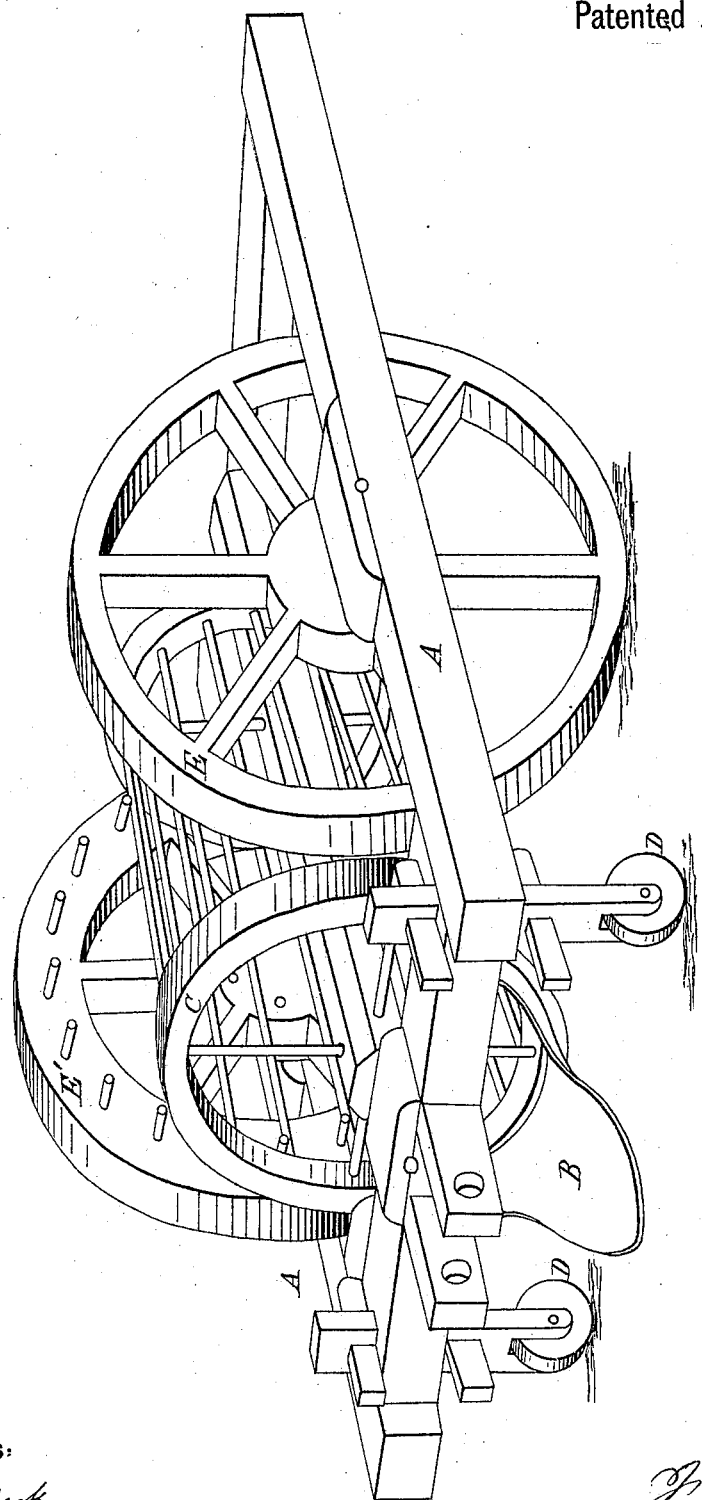
Witnesses:
John B. Hollenbeck
A. J. Howard
Inventor:
J. S. Adams
Sylvanus Richardson

United States Patent Office.

SYLVANUS RICHARDSON, OF JERICHO, AND JOHN S. ADAMS, OF BURLINGTON, VERMONT.

Letters Patent No. 61,259, dated January 15, 1867.

IMPROVEMENT IN POTATO DIGGER.

*The Schedule referred to in these Letters Patent and making part of the same.*

TO ALL WHOM IT MAY CONCERN:

Be it known that we, SYLVANUS RICHARDSON, of Jericho, and JOHN SULLIVAN ADAMS, of Burlington, both in the county of Chittenden, and State of Vermont, have invented an apparatus for Digging Potatoes; and we do hereby declare that the following is a full and exact description thereof, reference being had to the accompanying drawings, and to the letters of reference marked thereon.

The nature of our invention consists in constructing a cast-iron digger of such form as will pass under the hill of potatoes and throw the dirt and potatoes into a rodded cylinder, through which the dirt is sifted, the cylinder being propelled and revolved by one of the two wheels which carries the apparatus.

To enable others skilled in the art to make and use our invention, we will proceed to describe its construction and operation.

Figure 1 is a perspective view of the apparatus.

We construct a frame, A, for the apparatus, about four feet and four inches long and three feet six inches wide on the inside, the frame made of plank three inches thick and seven inches wide. To one end of this frame we attach our digger, B, of such a form as will readily and easily pass under the hill of potatoes, the back part of it being circular in form, with a radius corresponding to that of the cylinder hereinafter described, and some two inches more elevated than the point and flat portion of the digger. To enable us to firmly attach the digger to the frame, an arm on each side of the digger about six inches wide extends up, on a circle with the same radius with that of the cylinder referred to, to the upper side of the frame, and there forms a lip, for the purpose of bolting the same to the frame. Directly back of the digger we place a rodded cylinder, C, about three feet in diameter, the rods two feet long, and near enough to each other to prevent the potatoes from passing through or between them, the cylinder being sustained by a shaft, and rods for arms. On each side of this cylinder we place wheels E E, substantially made, on one of which wheels cogs are attached to correspond with the rods in the cylinder; these wheels to be three feet and four inches in diameter. By this arrangement the bottom of the cylinder will be ten inches higher than the bottom of the two wheels which sustain the apparatus, and will freely revolve, the digger having cleared the way two inches lower. In the forward part of the frame a tongue or pole may be placed as indicated. At the forward end of the frame we place a couple of gauge-wheels, D and $D^1$, about ten inches in diameter, the object of which is to enable us to gauge the depth of the digger, by means of keys above and below the frame. The apparatus is to be drawn by horses or oxen. Whenever the driver wishes to turn around, he tips down the back end of the frame sufficiently to enable the digger on the forward end to clear the ground, and when the apparatus is drawn on or off the field, the gauge-wheels can be lowered sufficiently to raise the digger above the ground.

What we claim as our invention, and desire to secure by Letters Patent, is—

The combination of the digger B, cylinder C, gauge-wheels D D', and supporting wheels E E', arranged and operating substantially as described.

SYLVANUS RICHARDSON,
J. S. ADAMS.

Witnesses:
JOHN B. HOLLENBECK,
A. J. HOWARD.